(12) United States Patent
Jiang et al.

(10) Patent No.: US 11,435,694 B2
(45) Date of Patent: Sep. 6, 2022

(54) CHIP DISMOUNTING AND MOUNTING DEVICE

(71) Applicant: Jiangxi YiBo E-TECH Co., Ltd., Xinyu (CN)

(72) Inventors: Peng Jiang, Xinyu (CN); Liangliang Hu, Xinyu (CN)

(73) Assignee: Jiangxi YiBo E-TECH Co., Ltd., Xinyu (CN)

(*) Notice: Subject to any disclaimer, the term of this patent is extended or adjusted under 35 U.S.C. 154(b) by 1262 days.

(21) Appl. No.: 15/878,724

(22) Filed: Jan. 24, 2018

(65) Prior Publication Data

US 2018/0314203 A1 Nov. 1, 2018

(30) Foreign Application Priority Data

Apr. 29, 2017 (CN) .......................... 201720468076.6
Jun. 14, 2017 (CN) .......................... 201720690517.7
Aug. 29, 2017 (CN) .......................... 201721087979.6

(51) Int. Cl.
*G03G 21/18* (2006.01)
*F16B 3/00* (2006.01)
*F16B 2/24* (2006.01)

(52) U.S. Cl.
CPC ......... *G03G 21/1875* (2013.01); *F16B 2/248* (2013.01); *F16B 3/00* (2013.01); *G03G 21/181* (2013.01); *G03G 21/1878* (2013.01); *G03G 21/1885* (2013.01); *G03G 2215/00987* (2013.01)

(58) Field of Classification Search
CPC ......... G03G 2221/1823; G03G 21/181; G03G 21/1875; G03G 21/1878; G03G 21/1882; G03G 21/1814; G03G 21/1842; G03G 21/1892; G03G 21/1889; G03G 2215/00987; F16B 3/00; F16B 2/248
See application file for complete search history.

(56) References Cited

U.S. PATENT DOCUMENTS

| | | | | |
|---|---|---|---|---|
| 9,075,387 B2 * | 7/2015 | Tanabe | ............... | G03G 21/1867 |
| 9,291,994 B2 * | 3/2016 | Kanno | ............... | G03G 21/1878 |
| 9,651,916 B2 * | 5/2017 | Kawakami | ......... | G03G 21/1885 |
| 9,996,052 B2 * | 6/2018 | Shimizu | ............... | G03G 21/185 |
| 10,935,928 B2 * | 3/2021 | Endo | .................. | G03G 21/1814 |
| 10,955,794 B2 * | 3/2021 | Shimizu | ............. | G03G 15/0894 |
| 11,016,440 B2 * | 5/2021 | Kawamura | ........ | G03G 21/1885 |
| 2021/0333749 A1 * | 10/2021 | Hu | ..................... | G03G 21/1814 |
| 2021/0389722 A1 * | 12/2021 | Suzuki | ................. | B41J 2/17559 |
| 2022/0004144 A1 * | 1/2022 | Sakai | ................. | G03G 21/1878 |
| 2022/0066353 A1 * | 3/2022 | Fukasawa | .......... | G03G 15/0863 |

* cited by examiner

*Primary Examiner* — Jonathan P Masinick
(74) *Attorney, Agent, or Firm* — FisherBroyles LLP; Kevin D. Jablonski

(57) ABSTRACT

A chip dismounting and mounting device, matched with a chip mounting part on a process cartridge. The chip dismounting and mounting device is capable of dismounting a chip disposed on the chip mounting part or mounting the chip on the chip mounting part. The chip dismounting and mounting device can smoothly dismount the chip on an exhausted process cartridge without damage and smoothly mount the dismounted chip on a new process cartridge. This alleviates the inconvenience for the user to dismount a chip on the exhausted process cartridge and mount the chip on the new process cartridge.

10 Claims, 7 Drawing Sheets

CHIP DISMOUNTING AND MOUNTING DEVICE

CLAIM OF PRIORITY

The present application claims priority and benefit from Chinese Patent Application No. 201720468076.6 filed Apr. 29, 2017; priority and benefit from Chinese Patent Application No. 201720690517.7 filed Jun. 14, 2017 and priority and benefit from Chinese Patent Application No. 201721087979.6 filed Aug. 29, 2017. The entire content of these applications are herein expressly incorporated by reference.

BACKGROUND

An imaging device is the one that forms a visual image on a recording medium through the electrophotographic imaging principle, and includes a copying machine, a printer, an LED printer, and the like. The imaging device generally includes a process cartridge that is detachably disposed on a main body of an imaging device, the existing process cartridge is in a plurality of forms, for example, the process cartridge can be a photosensitive drum cartridge including a photosensitive drum or a developing cartridge in which a developer is stored, or an integrated cartridge in which the developing cartridge and the photosensitive drum cartridge are integrally disposed.

Specifically, some conventional imaging devices form a desired image according to the following procedure. Firstly, the surface of the photosensitive drum is charged to a predetermined potential. A laser beam is projected onto the surface of the photosensitive drum to form an electrostatic latent image. The developer is supplied to the electrostatic latent image to obtain a visual image. Then, the visual image developed on the photosensitive drum is transferred onto a printing medium directly or through an intermediate transfer medium, and then is fixed to the printing medium by a fixing process.

In general, since the service life of the process cartridge is limited, the process cartridge is typically replaced when it is exhausted. For this reason, a user may need to know all kinds of information about the process cartridge. The process cartridge may be provided with a chip for storing all kinds of information about its operation. When the process cartridge is exhausted, it may need a new process cartridge for replacement. In order to reduce the use cost or for other reasons, one often dismounts the chip on the exhausted process cartridge and mounts the same in the new process cartridge for continuous use.

A process cartridge 1 as shown in FIG. 1 is provided with a chip mounting part 2, a chip 3 is mounted in the chip mounting part 2, it can be seen from the figure that the chip 3 of the process cartridge 1 is relatively small, and the process cartridge 1 is provided with a second limiting part 23a (as shown in FIG. 2) for preventing the drop of the chip 3, resulting in that the chip 3 is unlikely to dismount or mount, which results in significant inconvenience for the user.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION OF THE EMBODIMENTS

Figure 1:
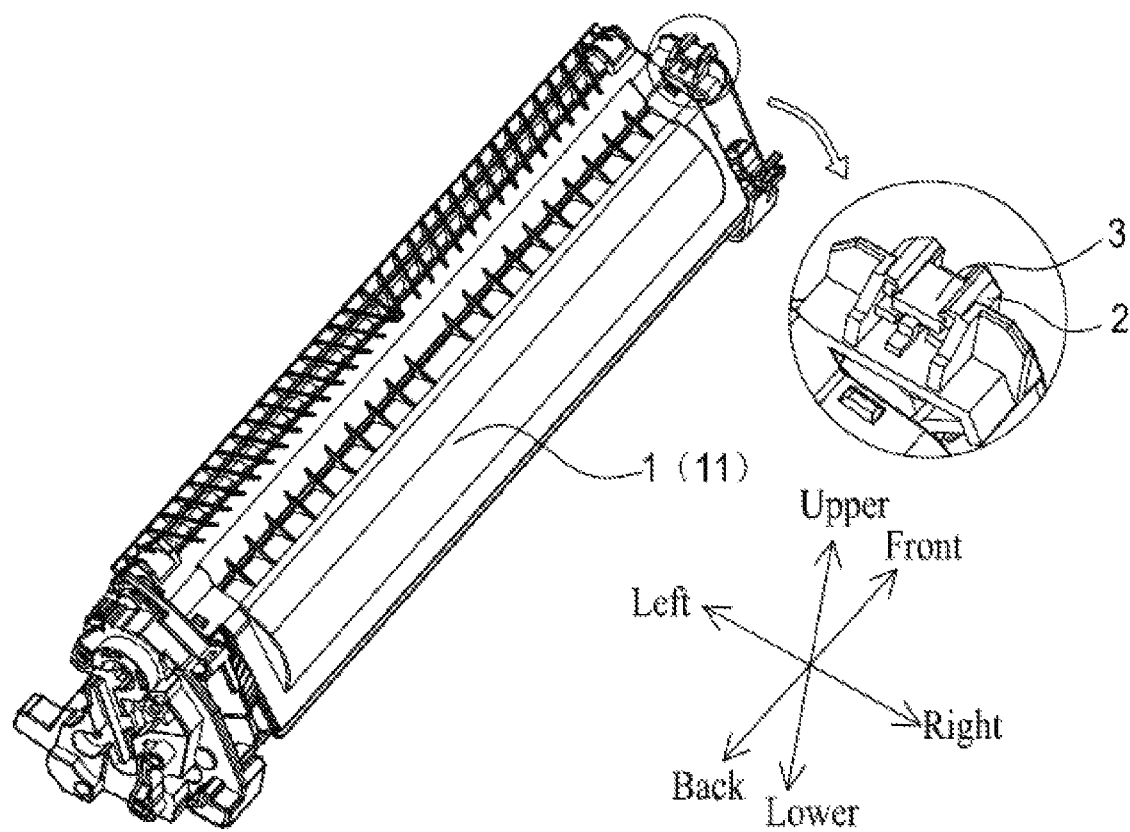
FIG. 1 is a conventional structural schematic diagram of a process cartridge.

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way an overview, the chip mounting and dismounting device as discussed herein may solve the problems as discussed in the background section. Namely, in order to solve the problem of inconvenience for a user to dismount a chip on an exhausted process cartridge and mount the chip on a new process cartridge, a novel chip mounting and dismounting device and method is presented. A chip dismounting and mounting device is capable of dismounting or mounting a chip disposed on a process cartridge. The chip dismounting and mounting device includes a fixed unit and a movable unit, which can move relative to each other; the fixed unit can be mounted on the process cartridge; when the fixed unit is mounted on the process cartridge, the movable unit moves from a first position to a second position along a path so as to dismount the chip from the process cartridge, and the movable unit moves from the second position to the first position along the path so as to mount the chip on the process cartridge.

The chip dismounting and mounting device may further include a limiting unit used for limiting the movable unit on the first position or the second position. The limiting unit may be an elastic member, and a third accommodation part and a fourth accommodation part used for accommodating free ends of the elastic member are disposed on the movable unit.

A chip mounting part for supporting the chip may be disposed on the process cartridge, a second limiting part for preventing the drop of the chip may be disposed on the chip mounting part, a third projection may be disposed on the chip dismounting and mounting device, and the third projection may press the second limiting part and cause the second limiting part to generate elastic deformation.

A chip mounting part for supporting the chip may be disposed on the process cartridge, the fixed unit may include a second accommodation part, a fourth projection may be disposed on the movable unit, and when the movable unit moves from the first position to the second position, the fourth projection may push the chip from the chip mounting part to the second accommodation part.

A third projection may be disposed on the movable unit, and when the movable unit moves from the second position to the first position, the third projection may push the chip from the second accommodation part to the chip mounting part.

A groove may be formed between the third projection and the fourth projection, and the groove can accommodate the chip. A through hole may be formed in an inner wall of the groove, and when the chip is located in the groove, the through hole may expose at least a part of the chip. A chip mounting part for supporting the chip may be disposed on the process cartridge, the chip mounting part includes a first guiding part, and the fixed unit may be provided with a first locating part matched with the first guiding part. The first guiding part may be constructed as a guiding rib protruding from the shell of the process cartridge, and the first locating part may be constructed as a locating groove that can be inserted in the guiding rib.

The fixed unit may include a first guiding groove, the movable unit may include a second guiding part, and the second guiding part may slide along the first guiding groove to cause the movable unit to move between the first position and the second position. A third projection and a fourth projection may be disposed on the second guiding part, and a groove for accommodating the chip may be formed between the third projection and the fourth projection.

A chip mounting part for supporting the chip may be disposed on the process cartridge, two welding projections for preventing the drop of the chip may be disposed on the chip mounting part, and a cutting part for cutting the welding projections may be disposed on the chip dismounting and mounting device. The cutting part may be disposed on the fixed unit. The movable unit may further include an operation part, which is set as a pair of concave circular arc parts. The chip dismounting and mounting device may further include a locking unit for locking the movable unit on the second position. When the chip dismounting and mounting device is mounted on the process cartridge, the locking unit unlocks the movable unit. At least two groups of guiding projections and guiding grooves capable of matching with each other may be disposed on the movable unit and the fixed unit.

By adoption of the above technical solution, the chip on the process cartridge can be dismounted smoothly and damage-freely, and the dismounted chip can be smoothly mounted on the process cartridge, and the inconvenience for the user to dismount the chip on the exhausted process cartridge and mount the chip on the new process cartridge is solved.

In order to facilitate a better understanding of the embodiments described herein, the following directions are defined, as shown in FIG. 1: the mounting direction of a chip 3 of a process cartridge 1 is defined as a front side, the corresponding dismounting direction of the chip 3 is a back side, one surface of the chip 3 electrically connected with an imaging device is defined as an upper side, the corresponding another direction is defined as a lower side, and directions vertical to front and back directions and upper and lower directions are left and right directions, which are specifically indicated by arrows in FIG. 1.

Figure 2:
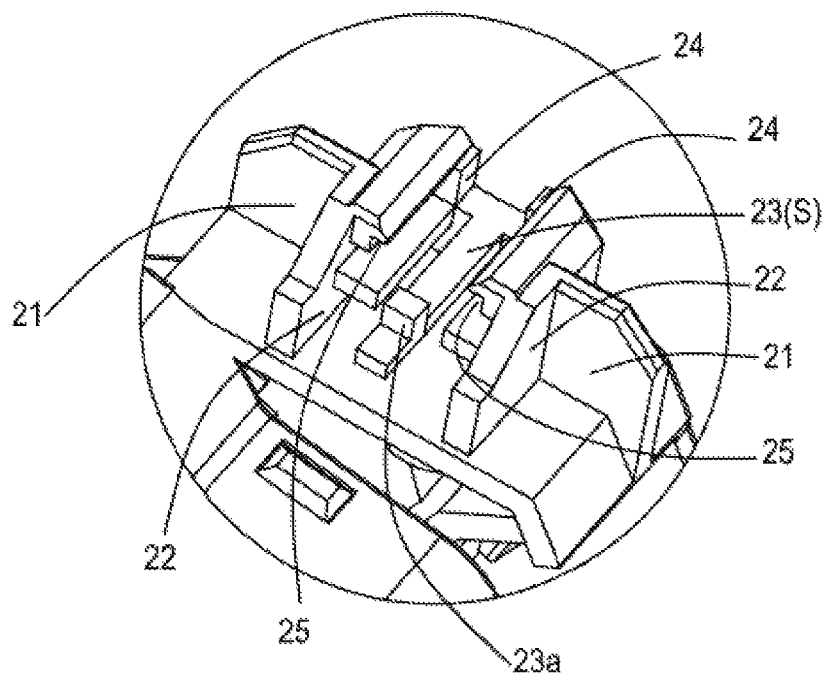
FIG. 2 is a partial structural schematic diagram of the process cartridge in FIG. 1 after a chip is dismounted according to an embodiment of the subject matter disclosed herein.

FIG. 1 is a structural schematic diagram of a conventional process cartridge 1. FIG. 2 is a partial structural schematic diagram of the process cartridge 1 of FIG. 1 after a chip 3 is dismounted. The process cartridge 1 is provided with a chip mounting part 2, and the chip mounting part 2 includes a first guiding part 21, which includes a pair of guiding ribs protruding upward from the surface of a shell 11 of the process cartridge 1 and disposed at intervals on the left and right directions. Two first vertical parts 22 are included which protrude upward from the surface of the shell 11 of the process cartridge 1 and are oppositely disposed on the left and right directions. A bearing part 23 is used for bearing the chip 3 and has certain elastic deformations on the upper and lower directions, wherein a second limiting part 23a is disposed on one end (i.e., back end) of the bearing part 23 for preventing the chip 3 from dropping from the back side of the chip mounting part 2. A first limiting part 24 is disposed on a front end of the chip mounting part 2 and used for preventing the chip 3 from dropping from the front side of the chip mounting part 2. Two first mounting grooves 25 extend in front and back directions of the chip mounting part 2 and are disposed opposite each other on the left and right directions of the chip mounting part 2. The first mounting grooves 25 limit the chip 3 on the upper and lower directions and, at the same time, the first vertical parts 22, the bearing part 23, the first limiting part 24 and the first mounting grooves 25 form a first accommodation part S.

When the chip 3 is to be mounted on the process cartridge 1, an external force is applied to the second limiting part 23a on the back end of the bearing part 23. The second limiting part 23a elastically deforms downward, so that there is an enough space for mounting the chip 3 on the chip mounting part 2 along the first mounting grooves 25. When the chip 3 is mounted on the chip mounting part 2, the chip 3 is accommodated in the first accommodation part S. The front end is limited by the first limiting part 24, the back end is limited by the second limiting part 23a, and the upper surface is limited by the first mounting grooves 25. Therefore, the chip can be stably mounted on the chip mounting part 2 of the process cartridge 1.

When the process cartridge is exhausted, a new process cartridge may be needed for replacement. In order to reduce the use cost or for other reasons, one may dismount the chip on the exhausted process cartridge and mount the same in the new process cartridge for continuous use. It can be seen from FIG. 1 that the chip 3 of this type of the process cartridge 1 of the model number is relatively small, thereby being difficult to operate or mount, and to this end, the embodiments of the present disclosure designs a chip dismounting and mounting device 5, and the structure of the chip dismounting and mounting device will be described in greater detail below according to FIG. 3 to FIG. 5.

Figure 3:
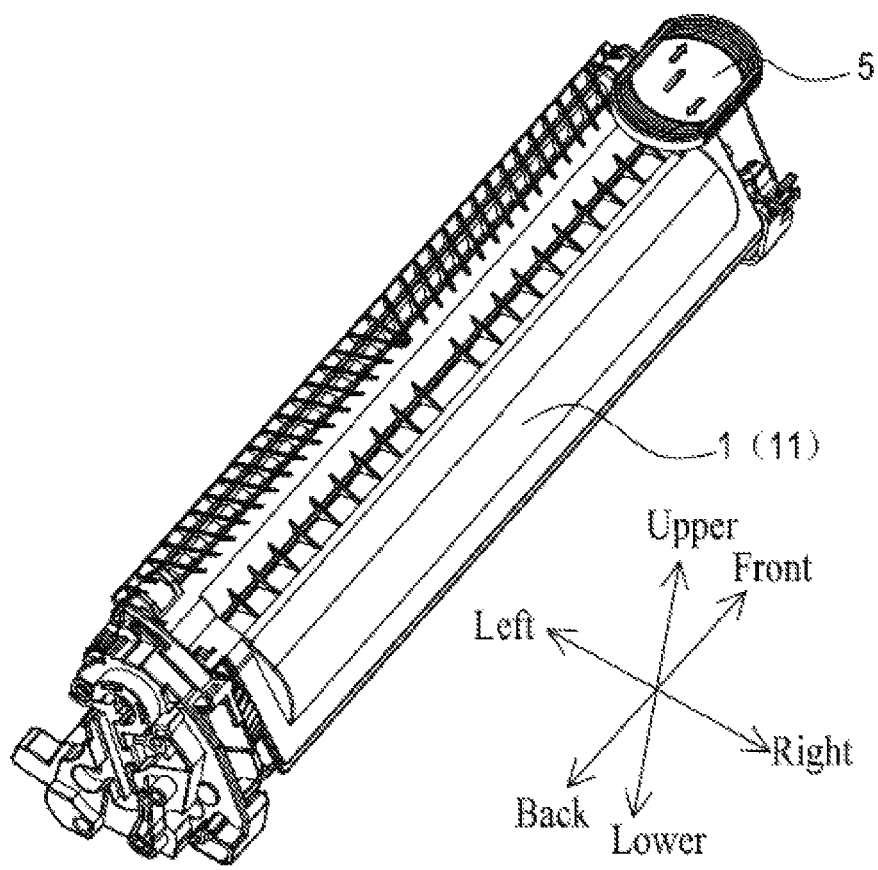
FIG. 3 is a structural schematic diagram of assembling a chip dismounting and mounting device on a process cartridge according to an embodiment of the subject matter disclosed herein.

FIG. 3 is a structural schematic diagram of assembling the chip dismounting and mounting device 5 on the process cartridge 1 according to a first embodiment of the subject matter disclosed herein. The chip dismounting and mounting device 5 is operated on the front and back directions of the chip mounting part 2, and the chip 3 can be smoothly dismounted from the chip mounting part 2, or the chip 3 is mounted on the chip mounting part 2.

Figure 4:
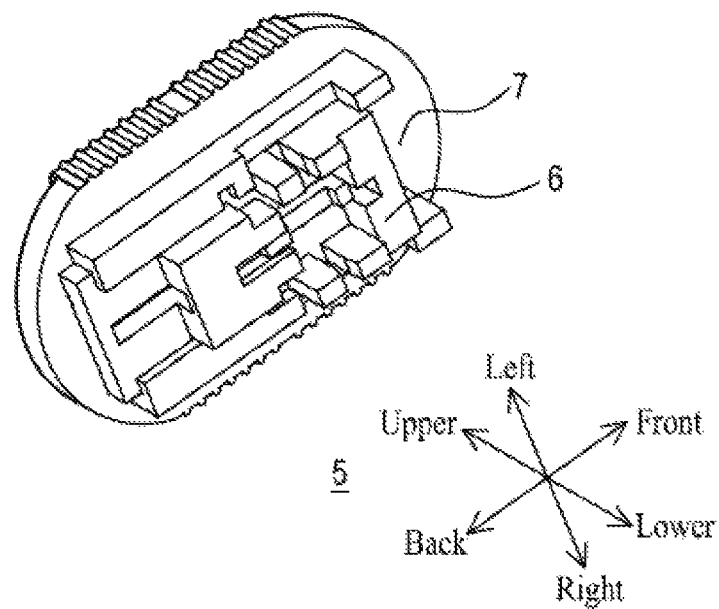
FIG. 4 is a structural schematic diagram when a movable unit of the chip dismounting and mounting device is located on a first position according to an embodiment of the subject matter disclosed herein.
Figure 5:
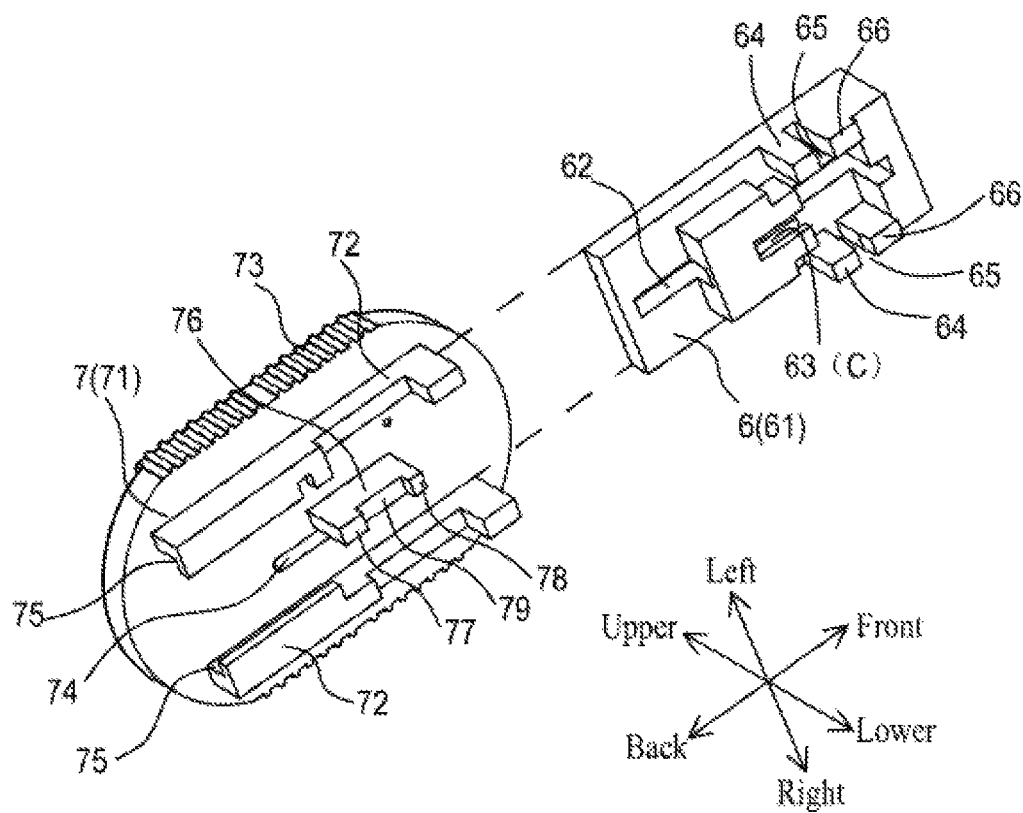
FIG. 5 is an exposed schematic diagram of the chip dismounting and mounting device according to an embodiment of the subject matter disclosed herein.
Figure 6:
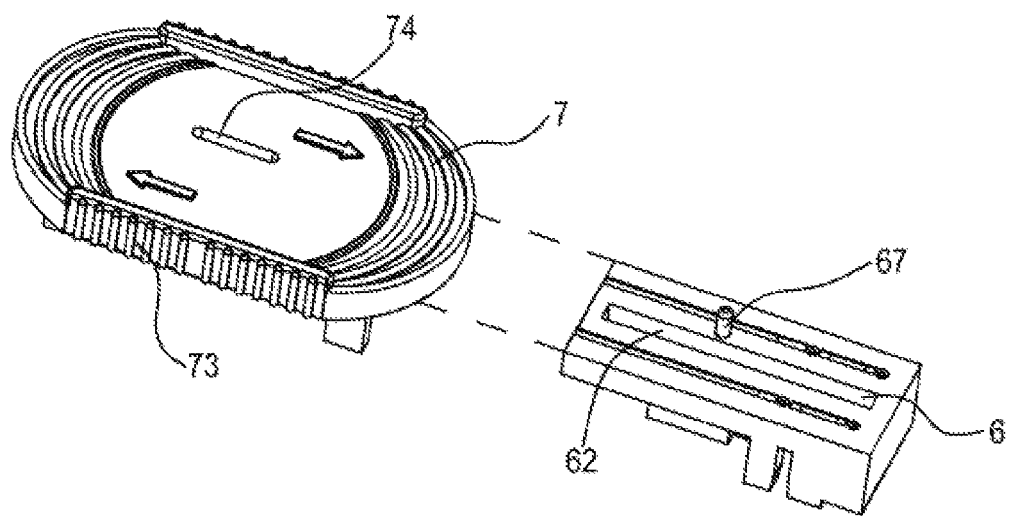
FIG. 6 is an exposed schematic diagram of the chip dismounting and mounting device according to an embodiment of the subject matter disclosed herein.
Figure 7:
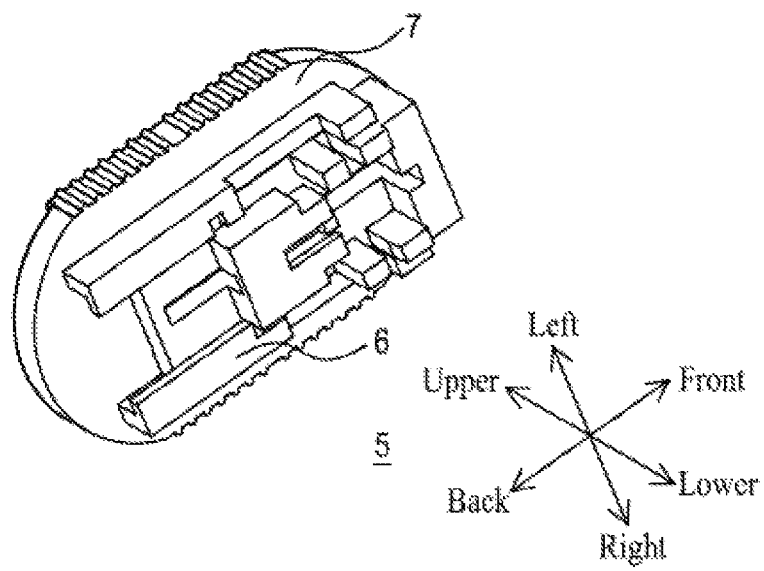
FIG. 7 is a structural schematic diagram of the chip dismounting and mounting device when the movable unit is located on a second position according to an embodiment of the subject matter disclosed herein.

FIG. 4 is a structural schematic diagram of the chip dismounting and mounting device 5 in the first embodiment of the subject matter disclosed herein when a movable unit 7 is located on a first position; FIG. 5 is an exposed schematic diagram of the chip dismounting and mounting device 5 in the first embodiment of the subject matter disclosed herein; FIG. 6 is an exposed schematic diagram of the chip dismounting and mounting device 5 in the first embodiment of the subject matter disclosed herein in another view; and FIG. 7 is a structural schematic diagram of the chip dismounting and mounting device 5 in the first embodiment of the subject matter disclosed herein when the movable unit 7 is located on a second position. As shown in FIG. 4 to FIG. 7, the chip dismounting and mounting device 5 includes a fixed unit 6 and the movable unit 7, which can move relative to each other. The fixed unit 6 includes a main body 61; a first locating part used for fixing the fixed unit 6 to the chip mounting part 2, in this embodiment, the first locating part is set as a locating groove 65 formed by a first projection 64 and a second projection 66 protruding from a lower surface of the main body 61, and the locating groove 65 is inserted into a first guiding part 21 of the chip mounting part 2 from top to bottom so as to fix the fixed unit 6 to the chip mounting part 2; a first guiding groove 62 extending on the front and back directions of the main body 61 of the fixed unit 6; two second mounting grooves 63 disposed oppositely on the left and right directions of the main body 61 of the fixed unit 6 and forming a second accommodation part C capable of accommodating the chip 3; and a first guiding projection 67. The movable unit 7 includes a main body 71; two second vertical parts 72 protruding from the lower surface of the movable unit 7 downward, extending along the front and back directions and disposed oppositely on the left and right directions; operation parts 73 disposed on the left and right sides of the movable unit 7 for facilitating the user operation; a second guiding groove 74 used for guiding the first guiding projection 67, wherein the cooperation of the first guiding projection 67 and the second guiding groove 74 ensures more table relative movement of the fixed unit 6 and the movable unit 7 but it is not a necessary condition; third mounting grooves 75 formed in the back ends of the two second vertical parts 72 and used for guiding the fixed unit 6; and a second guiding part 76 matched with the first guiding groove 62 and capable of sliding back and forth along the first guiding groove 62, wherein a third projection 77 and a fourth projection 78 are disposed on the second guiding part 76, a groove 79 is formed between the third projection 77 and the fourth projection 78, and the groove 79 can accommodate the chip 3. When the chip dismounting and mounting device 5 is used, the fixed unit 6 and the movable unit 7 are typically assembled together, the fixed unit 6 is inserted between the second vertical parts 72, and the fixed unit 6 is mounted in the movable unit 7 along the third mounting grooves 75, and thus the assembly of the fixed unit 6 and the movable unit 7 is accomplished.

A specific process of dismounting and mounting the chip 3 by using the chip dismounting and mounting device 5 is described below in detail according to FIG. 1 to FIG. 7.

When the chip 3 on the process cartridge 1 is to be dismounted, the movable unit 7 of the chip dismounting and mounting device 5 is retained on a first position (as shown in FIG. 4), the first guiding part 21 is inserted into the locating groove 65 of the fixed unit 6, the chip dismounting and mounting device 5 is fixed to the chip mounting part 2, at this point, the chip 3 in the chip mounting part 2 corresponds to the groove 79 formed between the third projection 77 and the fourth projection 78 on the upper and lower directions, the third projection 77 and the fourth projection 78 respectively abuts against the back end and the front end of the chip 3, then the user holds the operation parts 73 of the movable unit 7 to enable the movable unit 7 to slide backward, at this point, the second guiding part 76 on the movable unit 7 slides backward along the first guiding groove 62, the fourth projection 78 abuts against the front end of the chip 3 and overcomes the limiting of the second limiting part 23a to the chip 3 so as to push the chip into the second accommodation part C, the movable unit 7 of the chip dismounting and mounting device 5 is located on a second position (as shown in FIG. 7), then the chip dismounting and mounting device 5 is dismounted from the process cartridge 1, and thus the dismounting of the chip 3 is accomplished; and when the dismounted chip 3 is to be mounted to another new process cartridge (the chip mounting condition is also illustrated by taking the process cartridge 1 as an example), the chip 3 does not need to be dismounted from the chip dismounting and mounting device 5, in such a state that the movable unit 7 is retained on the second position, the chip dismounting and mounting device 5 is mounted on the chip mounting part 2, then the user holds the operation parts 73 of the movable unit 7 to enable the movable unit 7 to slide forward, at this point, the second guiding part 76 slides forward along the first guiding groove 62, the third projection 77 is positioned against the back end of the chip 3 and presses the second limiting part 23a, so that the second limiting part 23a generates downward deformation to overcome the limiting of the second limiting part 23a to the chip 3 so as to push the chip 3 into the first accommodation part S to accomplish the mounting of the chip 3, and at this point, the movable unit 7 returns to the first position from the second position.

In the first embodiment described above, the movable unit 7 of the chip dismounting and mounting device 5 can move to the first position (as shown in FIG. 4) and the second position (as shown in FIG. 7) to achieve the dismounting and mounting of the chip 3. The chip dismounting and mounting device 5, however, is not limited on the first position or the second position. When the user holds the chip dismounting and mounting device 5, the movable unit 7 may be liable to sliding relative to the fixed unit 6, resulting in drop of the chip 3. In order to further optimize the chip dismounting and mounting device 5, to solution may be found in a second embodiment.

Figure 8:
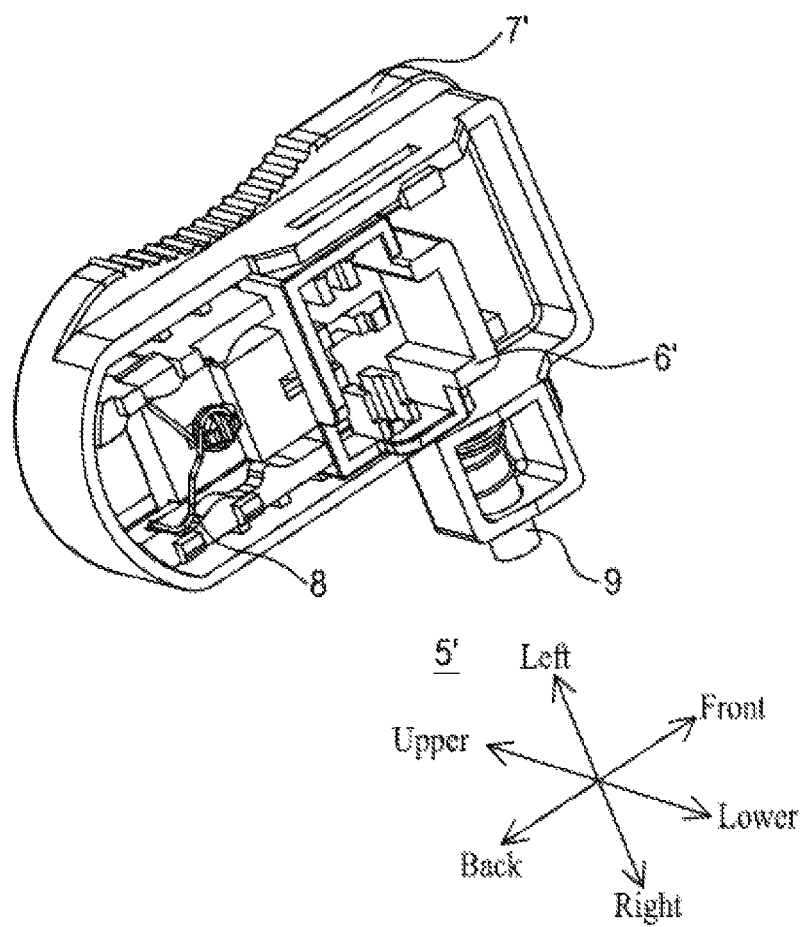
FIG. 8 is a structural schematic diagram of a chip dismounting and mounting device when a movable unit is located on a first position according to an embodiment of the subject matter disclosed herein.
Figure 9:
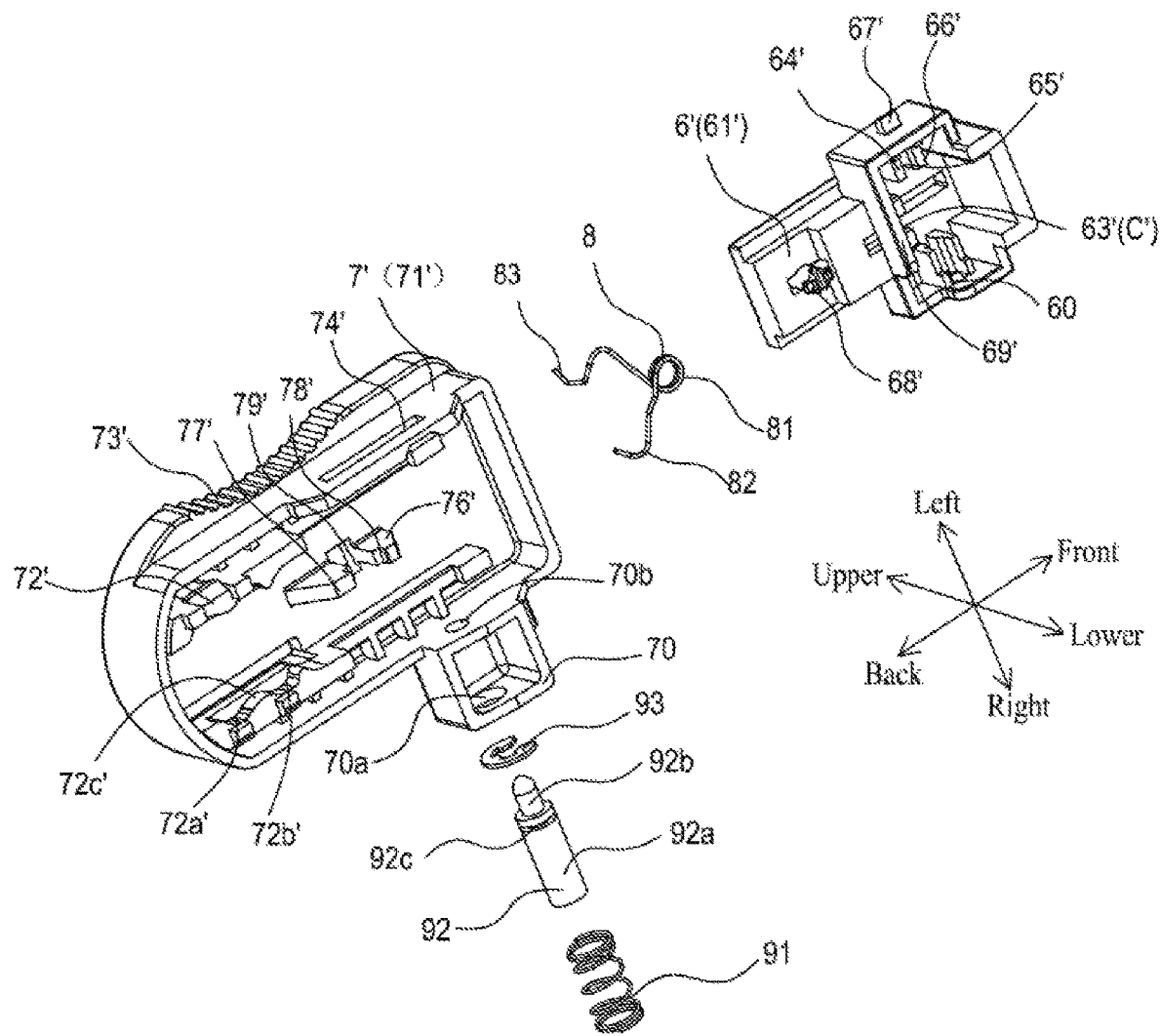
FIG. 9 is an exposed schematic diagram of the chip dismounting and mounting device according to an embodiment of the subject matter disclosed herein.
Figure 10:
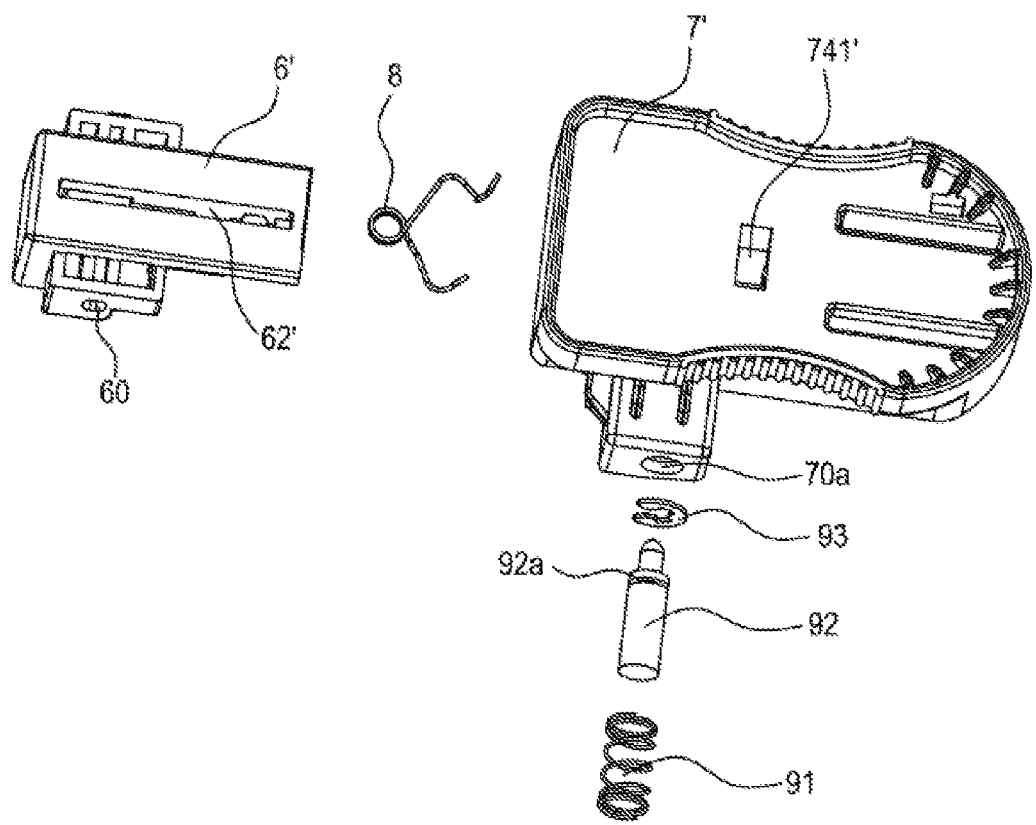
FIG. 10 is an exposed schematic diagram of the chip dismounting and mounting device according to an embodiment of the subject matter disclosed herein.
Figure 11:
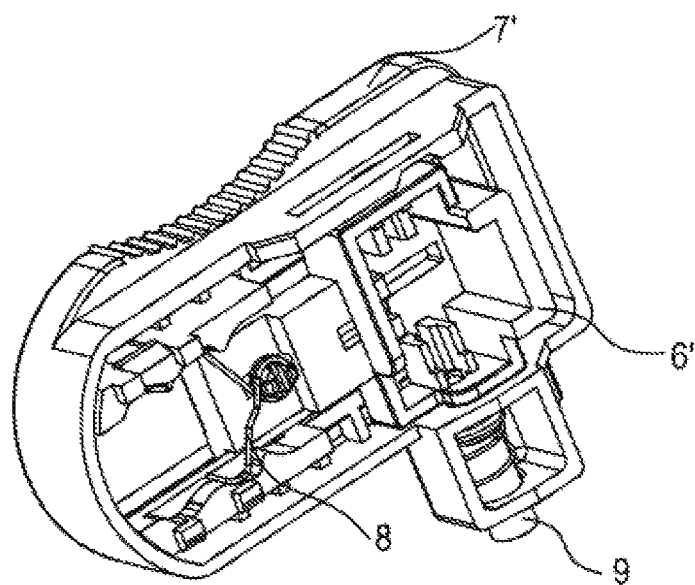
FIG. 11 is a structural schematic diagram of the chip dismounting and mounting device when the movable unit is located on the second position according to an embodiment of the subject matter disclosed herein.
Figure 11:
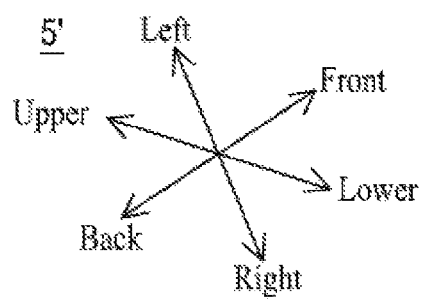

FIG. 8 is a structural schematic diagram of a chip dismounting and mounting device 5' in the second embodiment when a movable unit 7' is located on a first position. FIG. 9 is an exposed schematic diagram of the chip dismounting and mounting device 5' in the second embodiment. FIG. 10 is an exposed schematic diagram of the chip dismounting and mounting device 5' in the second embodiment in another view. FIG. 11 is a structural schematic diagram of the chip dismounting and mounting device 5' in the second embodiment when the movable unit 7' is located on the second position. As shown in FIG. 8 to FIG. 11, the chip dismounting and mounting device 5' includes a fixed unit 6', the movable unit 7', a limiting unit 8 and a locking unit 9, the fixed unit 6' includes a main body 61'. a first locating part used for fixing the fixed unit 6' to the chip mounting part 2. In this embodiment, the first locating part is set as a locating groove 65' formed by a first projection 64' and a second projection 66' protruding from a lower surface of the main body 61', and the locating grooves 65' are inserted onto a first guiding part 21 of the chip mounting part 2 from top to bottom so as to fix the fixed unit 6' to the chip mounting part 2. A first guiding groove 62' extending on the front and back directions of the main body 61' of the fixed unit 6'. Two second mounting grooves 63' disposed oppositely on the left and right directions of the main body 61' of the fixed unit 6' and forming a second accommodation part C' capable of accommodating the chip 3, a first guiding projection 67', a limiting unit matching part 68', a cutting part 69', and a first mounting part 60 set as a mounting hole and expressed as a first mounting hole 60. The movable unit 7' includes a main body 71', two second vertical parts 72' protruding from the lower surface of the movable unit 7' downwards and extending along the front and back directions and disposed oppositely on the left and right directions, a third accommodation part 72a' and a fourth accommodation part 72b' which are disposed on the back ends of the second vertical parts 72'. Further a limiting part 72c' is formed between the third accommodation part 72a' and the fourth accommodation part 72b', and the limiting part 72c' is set as a boss 72c' (expressed as a boss 72c' below) protruding toward the inner cavity of the movable unit 7'. Operation parts 73' disposed on the left and right sides of the movable unit 7'.

In the first embodiment, the operation parts 73 are parallel to the chip dismounting and mounting device 5, to further facilitate the user operation. In this embodiment, the operation parts 73' depressing inward from the two sides on the movable unit 7' and forming a certain radian. Due to such design, the user can more conveniently hold the operation parts 73' to enable the movable unit 7' to slide. A second guiding groove 74' used for guiding the first guiding projection 67', wherein the cooperation of the first guiding projection 67' and the second guiding groove 74' in conjunction with the cooperation of the fixed unit 6' and the third mounting groove 75 can prevent the movable unit 7' from rotating relative to the fixed unit 6' while moving between the first position and the second position. That is, at least two groups of guiding projections and guiding grooves capable of matching with each other are disposed on the movable unit 7' and the fixed unit 6' respectively to prevent the movable unit 7' from rotating relative to the fixed unit 6' while moving between the first position and the second position.

Third mounting grooves (not shown in the figure) formed in the back ends of the two second vertical parts 72' and used for guiding the fixed unit 6'. A second guiding part 76' matched with the first guiding groove 62' and capable of sliding back and forth along the first guiding groove 62', wherein a third projection 77' and a fourth projection 78' are disposed on the second guiding part 76'. A groove 79' is formed between the third projection 77' and the fourth projection 78', and the groove 79' can accommodate the chip 3. A through hole 741' in communication with the groove 79' formed between the third projection 77' and the fourth projection 78'. A second mounting part 70 including a second mounting hole 70a and a second mounting hole 70b, and the diameter of the second mounting hole 70a is greater than that of the second mounting hole 70b. The limiting unit 8 includes a limiting unit mounting part 81, wherein the limiting unit mounting part 81 mounts the limiting unit 8 to the limiting unit matching part 68' of the fixed unit 6'. A supporting part 82 accommodated in the third accommodation part 72a' and the fourth accommodation part 72b' on the movable unit 7'. When the movable unit 7' moves between the first position and the second position, the supporting part 82 of the limiting unit also moves between the third accommodation part 72a' and the fourth accommodation part 72b'. The supporting part 82 needs to pass through the boss 72c' when moving between the third accommodation part 72a' and the fourth accommodation part 72b'.

The boss 72c' is in opposition with the supporting part 82. The supporting part 82 can pass through the boss 72c' until the external force is applied to a certain extent, and the movement of the supporting part 82 between the third accommodation part 72a' and the fourth accommodation part 72b' is realized, so that the boss 72c' has a limiting function on the supporting part 82. A fixing part 83 stretching into the third mounting groove (not shown in the figure) ensures more stable mounting of the limiting unit 8. The limiting unit 8 is set as an elastic member, specifically a torsional spring structure is used, and optionally, other structures capable of realizing a limiting function can also be adopted. The locking unit 9 includes: an elastic member 91; a locking part 92, which is approximately columnar and includes a large diameter part 92a, a small diameter part 92b and a limiting member matching part 92c, and a cambered surface is disposed on the tail end of the small diameter part 92b; and a limiting member 93, wherein the limiting member 93 is preferably a clamp spring.

When the chip dismounting and mounting device 5' is used, the fixed unit 6', the movable unit 7', the limiting unit 8, and the locking unit 9 are typically assembled together. The assembly process begins with the limiting unit mounting part 81 of the limiting unit 8 (a limiting torsional spring) being mounted to the limiting unit matching part 68' to mount the limiting unit 8 to the fixed unit 6'. The assembled limiting unit 8 and the fixed unit 6' are inserted between the second vertical parts 72' along the direction from front to back, and the fixed unit 6' is mounted in the movable unit 7' along the third mounting grooves The first guiding projection 67' is inserted into the second guiding groove 74' to prevent the fixed unit 6' from dropping from the movable unit 7', and, thus, the assembly of the fixed unit 6', the movable unit 7' and the limiting unit 8 is accomplished. The locking unit 9 is mounted and the elastic member 91 is placed in the inner cavity formed by the second mounting part 70, the diameter of the elastic member 91 is greater than that of the second mounting hole 70a for preventing the elastic member 91 from interfering with the second mounting hole 70a. The locking part 92 penetrates through the second mounting hole 70a, the elastic member 91 and the third mounting hole 70b, irrespectively. The limiting member 93 (a clamp spring) is mounted to the limiting member matching part 92c to accomplish the mounting of the locking unit 9. One end of the elastic member 91 is contiguous with the inner wall on the right side of the inner cavity formed by the second mounting part 70. The other end is contiguous with the limiting member 93, and the diameter of the limiting member 93 is greater than that of the second mounting hole 70a and that of the third mounting hole 70b. The small diameter part 92b of the locking part 92 penetrates through the third mounting hole 70b and is inserted into the first mounting hole 60 to lock the movable unit 7' on the second position. Specifically, the small diameter part 92b includes a circular arc part located at a point and a cylindrical part abutting the circular arc part, and at least a part of the cylindrical part is clamped in the first mounting hole 60 to lock the movable unit 7' on the second position preventing movement.

Figure 12:
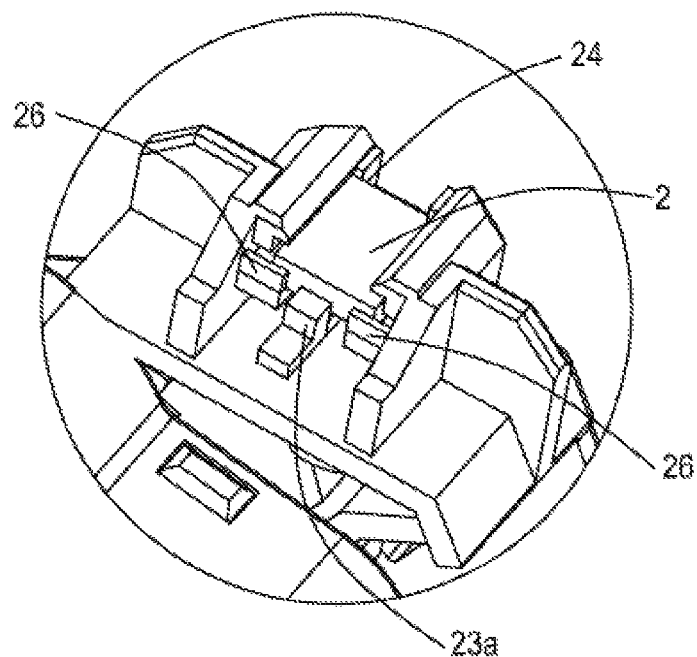
FIG. 12 is a conventional structural schematic diagram of a chip mounting part with another structure of the process cartridge.

FIG. 12 is a structural schematic diagram of the chip mounting part 2 with another structure of the process cartridge 1 in the prior art, the structures of the process cartridge 1 and the chip mounting part 2 are basically the same, and thus will not be repeated redundantly herein. The difference lies in that, in order to further prevent the chip 3 from sliding off the first accommodation part S, after the chip 3 is mounted, spot welding may be performed on the left and right sides of the back end of the lower end groove surface of the first mounting groove 25 to form two welding projections 26, so as to further prevent the chip 3 from dropping from the chip mounting part 2.

A specific process of dismounting and mounting the chip 3 by using the chip dismounting and mounting device 5' is described below in detail according to FIG. 8 to FIG. 12.

When the chip 3 on the process cartridge 1 needs to be dismounted, the movable unit 7' is initially located on the first position (as shown in FIG. 8), at this point, the supporting part 82 of the limiting unit 8 is accommodated in the third accommodation part 72a' of the movable unit 7', and the locking part 92 of the locking unit 9 is located in front of the fixed unit 6' and does not limit the fixed unit 6'. The first guiding part 21 is inserted in the locating groove 65' of the fixed unit 6', at this point, the cutting part 69' of the fixed unit 6' cuts the two welding projections 26 on the chip mounting part 2. After the two welding projections 26 are cut, the chip dismounting and mounting device 5' are fixed to the chip mounting part 2. At this point, the chip 3 in the chip mounting part 2 corresponds to the groove 79' formed between the third projection 77' and the fourth projection 78' on the upper and lower directions. The third projection 77' and the fourth projection 78' respectively abut against the back end and the front end of the chip 3. Then, the user holds the operation parts 73' of the movable unit 7' to enable the movable unit 7' to slide backward, at this point, the second guiding part 76' on the movable unit 7' slides backward along the first guiding groove 62'. The fourth projection 78' abuts against the front end of the chip 3 and overcomes the limiting of the second limiting part 23a to the chip 3 so as to push the chip into the second accommodation part C'. The supporting part 82 of the limiting unit 8 overcomes the limiting of the boss 72c' and arrives at the fourth accommodation part 72b' from the third accommodation part 72a' by passing the boss 72c'. The locking part 72 can slide into the first mounting hole 60 along the outer wall of the fixed unit 6' to lock the movable unit 7' so as to prevent the movable unit 7' from sliding. The movable unit 7' of the chip dismounting and mounting device 5' is located on the second position (as shown in FIG. 11), then the chip dismounting and mounting device 5' is dismounted from the process cartridge 1, and, thus, the dismounting of the chip 3 is accomplished.

When the dismounted chip 3 needs to be mounted to another new process cartridge (the chip mounting condition is also illustrated by taking the process cartridge 1 as an example), the chip 3 does not need to be dismounted from the chip dismounting and mounting device 5', in such a state that the movable unit 7' is retained on the second position, the chip dismounting and mounting device 5' with the chip 3 is mounted to the chip mounting part 2. Then, a circular arc part on the point of the small diameter part 92b of the locking part 92 is pressed by the first guiding part 31 (not shown in the figures) of the chip mounting part 2. The locking part 92 overcomes the elastic force of the elastic member 91 to move, so that the cylindrical part of the small diameter part 92b retracts from the first mounting hole 60. At this point, only the circular arc part of the small diameter part 92b abuts against the first mounting hole 60 to accomplish the unlocking action of the locking unit 9. Then the user holds the operation parts 73' of the movable unit 7' to enable the movable unit 7' to slide forward. At this point, the circular arc part of the small diameter part 92b slides out from the first mounting hole 60 under the action of the external force and slides to the front end of the fixed unit 6' along the outer wall of the fixed unit 6'. The second guiding part 76' slides forward along the first guiding groove 62'. The third projection 77' abuts against the back end of the chip 3 and overcomes the limiting of the second limiting part 23a to the chip 3 so as to push the chip 3 into the first accommodation part S. The supporting part 82 of the limiting unit 8 overcomes the limiting of the boss 72c' and arrives at the fourth accommodation part 72b' from the third accommodation part 72a' by passing the boss 72c' to accomplish the mounting of the chip 3, and the movable unit 7' returns to the first position from the second position. In the dismounting and mounting process, the chip 3 can be seen from the through hole 741'. That is, a through hole 741' can expose at least a part of the chip 3, and thus whether the chip 3 is dismounted or mounted can be determined more directly.

Compared with the first embodiment, in the second embodiment, the limiting unit 8 and the locking unit 9 are added to prevent the situation that when the user holds the chip dismounting and mounting device 5'. The movable unit 7' slides relative to the fixed unit 6' due to shake and other external forces to cause dropping of the chip 3, the locking unit 9 locks the movable unit 7' on the second position to further stabilize the cooperation of the fixed unit 6' and the movable unit 7. Those skilled in the art understand that the limiting unit 8 and the locking unit 9 are disposed to further optimize the chip dismounting and mounting device 5', which is not a necessary condition.

By means of the operations in the above embodiment, the chip 3 can be smoothly dismounted from the chip mounting part of the process cartridge, or the dismounted chip can be smoothly mounted on the chip mounting part of a new process cartridge, and the inconvenience for the user to dismount the chip on the exhausted process cartridge and mount the chip on the new process cartridge is solved.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A chip manipulation device, comprising:
   a fixed unit configured to be coupled to a process cartridge having a chip mounted thereon; and
   a movable unit coupled to the fixed unit and configured to move relative to the fixed unit; and
   a limiting unit configured to limit motion of the movable unit at the first position or the second position that includes
      an elastic member;

a first accommodation part configured to accommodate a first free end of the elastic member contiguous with the movable unit; and a second accommodation part configured to accommodate a second free end of the elastic member contiguous with the movable unit;

wherein the movable unit is further configured to move from a first position to a second position along a path so as to dismount the chip from the process cartridge; and wherein the movable unit is further configured to move from the second position to the first position along the path so as to mount the chip on the process cartridge.

2. The chip manipulation device of claim 1, further comprising:

a projection wherein a chip mounting part for supporting the chip is disposed on the process cartridge; and wherein a second limiting part for preventing the drop of the chip is disposed on the chip mounting part such that the projection biases the second limiting part causing elastic deformation of the second limiting part.

3. The chip manipulation device of claim 1, further comprising: an accommodation part disposed on the fixed unit; and a first projection disposed on the movable unit wherein a chip mounting part for supporting the chip is disposed on the process cartridge and when the movable unit moves from the first position to the second position, the first projection is configured to bias the chip from the chip mounting part to the accommodation part.

4. The chip manipulation device of claim 3, wherein a second projection is disposed on the movable unit, and when the movable unit moves from the second position to the first position, the second projection biases the chip from the accommodation part to the chip mounting part.

5. The chip manipulation device of claim 4, further comprising a groove formed between the first projection and the second projection configured to accommodate the chip.

6. The chip manipulation device of claim 5, further comprising a through hole formed in an inner wall of the groove, and when the chip is located in the groove, the through hole exposes at least a part of the chip.

7. The chip manipulation device of claim 1, wherein the movable unit further comprises an operation part including a pair of concave circular arc parts.

8. The chip manipulation device of claim 1, further comprising a locking unit configured to lock the movable unit in the second position.

9. The chip manipulation device of claim 8, wherein the locking unit is further configured to unlock the movable unit when the chip manipulation device is mounted on the process cartridge.

10. The chip manipulation device of claim 1, further comprising at least two groups of guiding projections and guiding grooves capable of matching with each disposed on the movable unit and the fixed unit.

* * * * *